Figure 1:
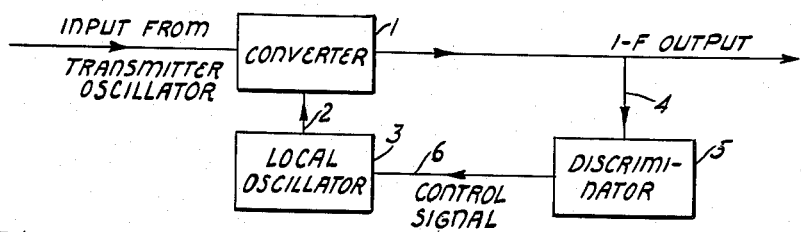

April 22, 1952     A. C. MUNSTER     2,594,263
AUTOMATIC FREQUENCY CONTROL SYSTEM
Filed Jan. 21, 1948     3 Sheets-Sheet 1

INVENTOR.
ALLEN C. MUNSTER
BY
AGENT

April 22, 1952  A. C. MUNSTER  2,594,263
AUTOMATIC FREQUENCY CONTROL SYSTEM
Filed Jan. 21, 1948  3 Sheets-Sheet 2

INVENTOR.
ALLEN C. MUNSTER
BY
AGENT

Patented Apr. 22, 1952

2,594,263

UNITED STATES PATENT OFFICE 2,594,263

AUTOMATIC FREQUENCY CONTROL SYSTEM

Allen C. Munster, Philadelphia, Pa., assignor to Philco Corporation, Philadelphia, Pa., a corporation of Pennsylvania Application January 21, 1948, Serial No. 3,478

2 Claims. (Cl. 250—36)

The invention herein described and claimed relates to improved automatic frequency control systems. In particular it relates to such systems for use in radar receivers of the superheterodyne type in which the local oscillator comprises a thermally tunable, velocity modulation type vacuum tube.

In receivers employed in radar systems and which customarily make use of automatic frequency control to compensate for variations in the frequency of the transmitted signal, reflections of which are subsequently received from target objects, it is the usual practice for the automatic frequency control circuits to be operated in response to the transmitted signal rather than in response to the received reflections thereof from target objects. This provides much more effective control of the receiver circuits because of the greater strength of the transmitted signals as compared with the received reflections thereof. For this purpose there is customarily employed in the receiver a discriminator of conventional form, supplied with a signal of suitable intermediate frequency which may be obtained by heterodyne frequency conversion, in the usual manner, of a suitably attenuated signal from the transmitter. The output from this discriminator, which is a function of the departure of the transmitter frequency from a predetermined nominal value, is applied to vary the frequency of the local oscillator in the receiver in such manner that the intermediate frequency, to which the received reflected signals are converted by means of a converter cooperating with the local oscillator, is maintained essentially constant.

In such a system it has been customary in the past for the local oscillator to comprise a velocity modulation type vacuum tube having a repeller electrode to which the output from the discriminator is applied, whereby relatively small variations in the frequency of the oscillator are produced without actual change in tuning of the output cavity of the velocity modulation tube. More recently, however, it has been proposed to employ, as a local oscillator, a velocity modulation type tube in which the actual tuning of the output cavity is varied by means of a thermal element responsive to the magnitude of the control signal. By using such a tube it has been found that an appreciable gain in signal to noise ratio is obtainable, by reason of the fact that the output cavity is always tuned to the frequency of the output signal generated by the oscillator.

When, however, a thermally controllable tube of this sort is employed as a local oscillator, certain difficulties are encountered owing to the fact that the frequency of the output from the tube is susceptible of variation throughout a relatively wide range, and further owing to the fact that, in a radar system employing, as is customary, a cavity magnetron oscillator as a primary source of super-high frequency energy, a substantial amount of time is required, after the application of power to the magnetron, before it becomes operative at substantial efficiency. During such periods of "warming-up" there will be no signal available for supply to the input of the automatic frequency control discriminator and hence there will be no control over the frequency of the local oscillator, which, in general, will reach full efficiency of operation before the cavity magnetron which comprises the transmitter. During this period the local oscillator may drift considerably in frequency so that, when the transmitter oscillator finally achieves its normal operating level, the value of the intermediate frequency signal applied to the discriminator may not be such as to cause the discriminator to produce a suitable output tending to control the local oscillator frequency to the required value to compensate for the then existing frequency of the transmitter signal. Furthermore, the range of possible variation in the frequency of the output from such a tube is so large that the desired intermediate frequency may be produced when the local oscillator frequency is equal either to the sum or to the difference of the transmitter frequency and the desired intermediate frequency. This leads to difficulty because of the fact that for only one of these values of local oscillator frequency will the output of a conventional discriminator circuit, employed for automatic frequency control purposes, be in the proper sense to maintain the local oscillator frequency at the proper value. For the other value of local oscillator frequency, the output of the discriminator will be such as to produce instability of operation—that is, the output of the discriminator will vary in such manner, in response to variations in the input signal thereto, as to control the local oscillator frequency away from the desired value rather than toward it. Thus, if, during the period of "warm-up," the local oscillator frequency varies throughout a range which includes the undesired value as well as the desired value, and if the local oscillator is operating in the vicinity of the undesired value at the time when the discriminator begins to receive input signal from the converter, there may be considerable delay before the automatic frequency control circuits commence to operate in the desired manner. In fact it is even possible that such operation may never be achieved and that the local oscillator frequency will continue indefinitely to be controlled away from the desired value rather than toward it. Moreover, even after the transmitter has attained its normal operating output level, sudden changes in the frequency of its output may occur which will alter the intermediate frequency to such an extent as to render the automatic frequency control circuits ineffectual. In this event, unless some means are provided for controlling the local oscillator so as to restore the intermediate frequency to a value such as to permit the automatic frequency control circuits to regain control, this undesirable situation may continue indefinitely.

It is the principal object of the invention to provide means for eliminating these difficulties and for insuring that the usual automatic frequency control circuits in a system of the sort just described, employing a thermally tunable local oscillator, will become operative and take over their intended function as soon as possible after the transmitter oscillator has reached its normal level of operation.

Another object of the invention is to provide, in an automatic frequency control system employing a discriminator of conventional form operative in response to a signal whose frequency is to be controlled, and in which the discriminator becomes ineffectual whenever the signal departs in frequency from a predetermined value by more than a certain amount, means for automatically restoring the frequency of the signal to a value such as to render the discriminator again effectual.

A further object of the invention is to provide, in an automatic frequency control system comprising a heterodyne frequency converter adapted to be supplied with signal from a local oscillator and with an input signal, and comprising a discriminator responsive to the output of said converter for controlling the frequency of said local oscillator whenever the frequency of output from said converter lies within a predetermined range, means operative whenever the frequency of output from said converter lies outside said predetermined range for controlling said local oscillator in a manner to bring said output frequency again within said range.

In accordance with the invention these objectives are achieved through the provision of means for precisely controlling and limiting the range of frequencies through which the output from the thermally tunable local oscillator varies during the period of "warm-up" of the transmitter oscillator and at all times when the normal automatic frequency control circuits are ineffectual because of the fact that the intermediate frequency signal supplied to them is not of a suitable value. The range of variation, to which the frequency of the output from the local oscillator is thus constrained, is made sufficiently wide to take account of any normal variations in the intermediate frequency owing to variations in the frequency of the output from the transmitter oscillator, but is limited so as to avoid the possibility of producing the intermediate frequency by such a combination of the transmitter frequency and the local oscillator frequency that the output of the automatic frequency control discriminator will vary in such a manner as to produce instability. Moreover, during this period of "warm-up" the frequency of the local oscillator is caused to sweep back and forth repeatedly within the prescribed range. This has the effect of insuring that, shortly after the transmitter oscillator is producing substantial output, the converter at the receiver will be caused to produce an intermediate frequency signal of a suitable frequency to actuate the discriminator and cause the automatic frequency control circuits to commence functioning. When this occurs, the output of the discriminator is applied to control the frequency of the local oscillator and the means provided for sweeping the frequency of the local oscillator during the "warm-up" period are rendered inoperative.

Accordingly another object of the invention is to provide novel and improved means for precisely controlling the frequency of an oscillator and for constraining it to vary within a predetermined definite range.

Figure 2:
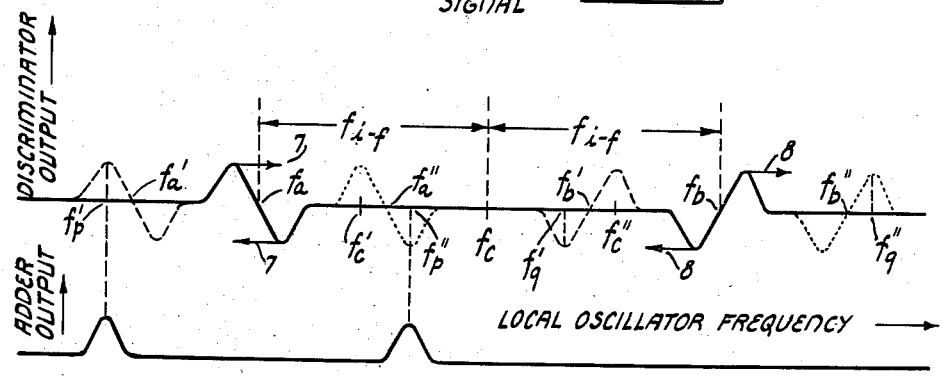
Figure 3:
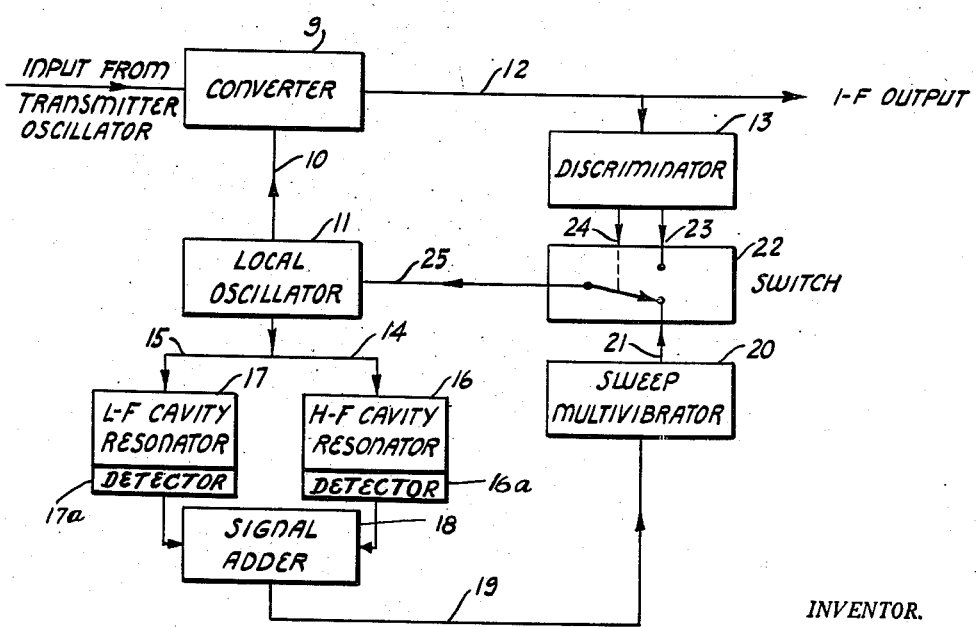
Figure 4:
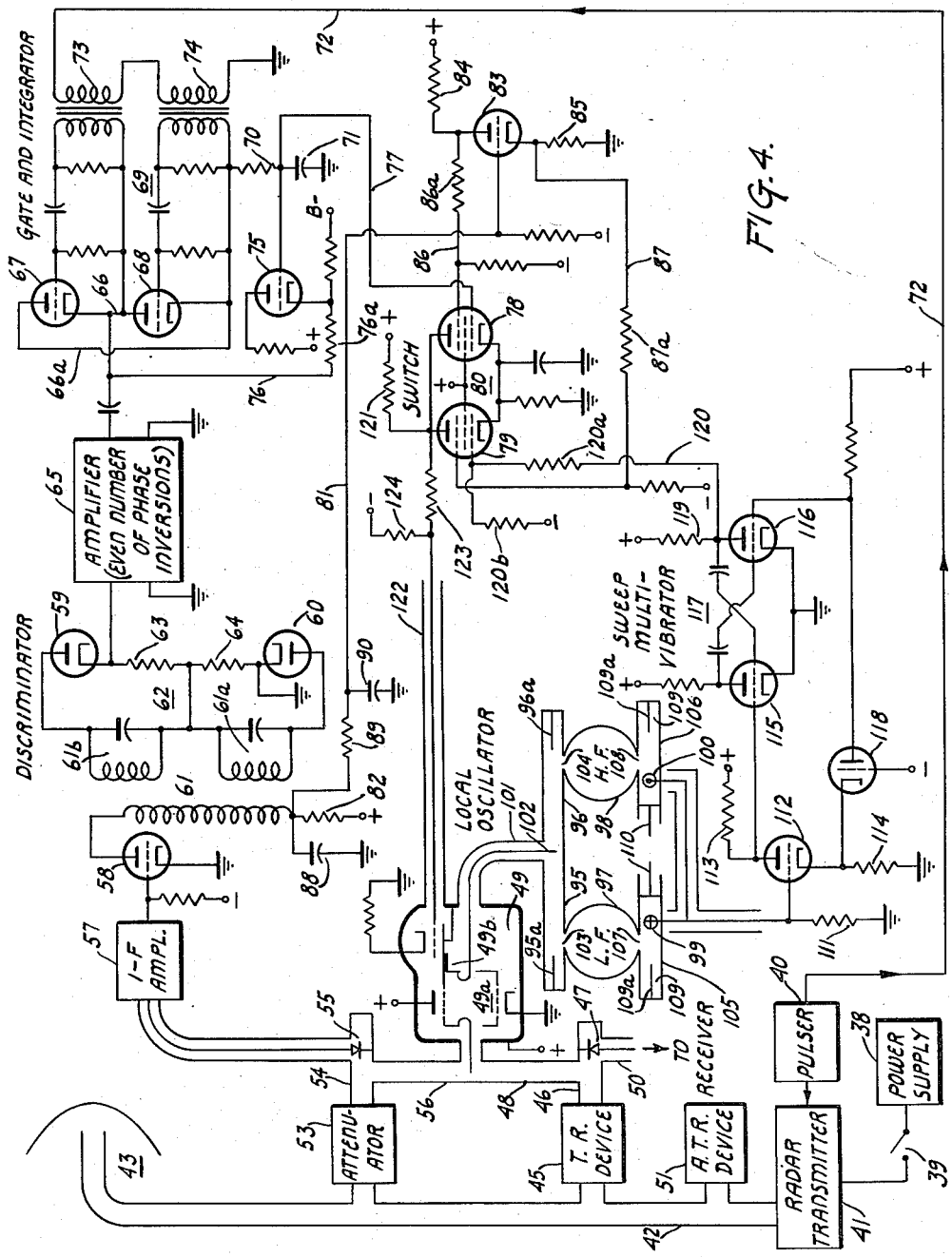
Figure 4A:
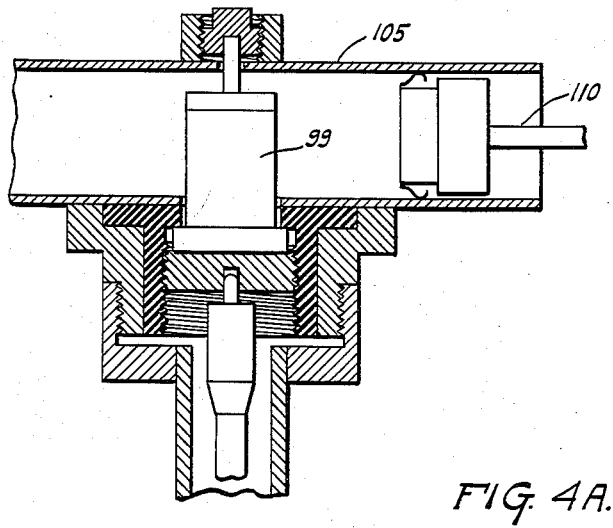
Figure 4B:
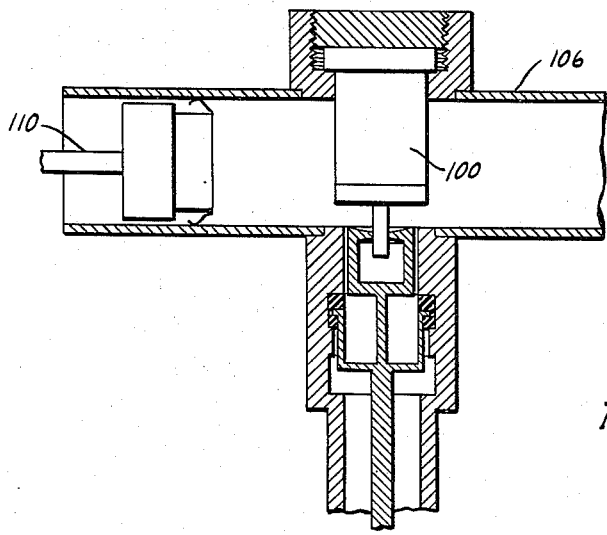

The method by which these results are achieved and the means for accomplishing them will be more fully understood from a consideration of the following detailed description with reference to the accompanying drawings in which:

Fig. 1 is a block diagram of a conventional automatic frequency control circuit to which the invention is applicable, Fig. 2 is a diagram which will be referred to in explaining the principle and mode of operation of the invention, Fig. 3 is a block diagram of a typical embodiment of the invention, Fig. 4 is a schematic diagram of a system in accordance with the invention, and Figs. 4A and 4B are diagrams illustrating certain structural details of the system according to Fig. 4.

Before proceeding with a detailed description of a typical embodiment of the invention, it will be helpful first to consider in further detail the nature of the difficulties to be eliminated. This can most readily be done by reference to Figs. 1 and 2 of the drawings. Fig. 1 shows an elementary automatic frequency control system in which a converter 1 is supplied with input signal, for example, from the transmitter oscillator of a conventional radar system. Converter 1 is also supplied through connection 2 with local oscillator signal from local oscillator 3, the output frequency from which is assumed to be variable throughout such a range that the desired intermediate frequency of the output from converter 1, which is equal to the difference in frequency between the output from local oscillator 3 and the input to converter 1 from the transmitter oscillator, may be obtained for either of two values of local oscillator frequency within said range—namely, when the local oscillator frequency is either greater or less in frequency than the input to converter 1 by an amount equal to the intermediate frequency. The intermediate frequency output from converter 1 is supplied through connection 4 to a conventional discriminator circuit 5. The control voltage developed by discriminator 5 is supplied through connection 6 to control the frequency of local oscillator 3. Local oscillator 3, for example, may be a thermally tunable velocity-modulation type vacuum tube of the sort hereinbefore mentioned.

In Fig. 2 is shown a plot of the output of discriminator 5 in the arrangement according to Fig. 1 as a function of the output frequency of local oscillator 3. The solid line in the upper portion of this figure represents the variations in the discriminator output with local oscillator frequency for a particular value of the frequency of the input from the transmitter oscillator to converter 1 of the arrangement according to Fig. 1. It will be noted that this curve has two crossover points at frequencies $f_a$ and $f_b$ displaced respectively below and above the transmitter oscillator frequency $f_c$ by the value of the desired intermediate frequency $f_{i-f}$. It will further be noted that the discriminator output in the vicinity of $f_a$ is positive below and negative above $f_a$, while, in the vicinity of $f_b$, the discriminator output is negative below and positive above $f_b$. If the discriminator output in the vicinity of $f_a$ is such as to control the local oscillator toward $f_a$, as indicated by arrows 7, then the discriminator output in the vicinity of $f_b$ will be such as to control the local oscillator frequency away from $f_b$, as indicated by arrows 8, and thus to produce instability of operation. As indicated above, this curve represents the discriminator outputs only for a particular value of frequency of the input to converter 1 from the transmitter oscillator. In practice, of course, this frequency will vary and hence the discriminator output curve will, in effect, move up and down along the frequency axis throughout a predetermined range depending upon the range of variation of the output frequency of the transmitter oscillator. For example, the range of variation of the transmitter oscillator frequency may lie between frequencies $f_c'$ and $f_c''$. If the transmitter oscillator frequency assumes its extreme lower value $f_c'$, the discriminator output curve will appear as represented by the broken line and will have crossover points at frequencies $f_a'$ and $f_b'$ respectively. On the other hand, if the transmitter oscillator frequency assumes its extreme upper value $f_c''$ then the discriminator output curve will be as represented by the dotted line and will have crossover points at frequencies $f_a''$ and $f_b''$ respectively. It will be obvious therefore that, in order for the automatic frequency control circuit to become operative, the frequency of the local oscillator should have some value within the range $f_p'$—$f_p''$, the upper and lower limits of which are determined respectively by the two extreme positions of the peaks of the left-hand portion of the discriminator output curve. On the other hand, for the reasons hereinbefore indicated, the local oscillator frequency must not be permitted to enter the range $f_q'$—$f_q''$.

According to the invention it is proposed therefore to provide means for sweeping the frequency of the local oscillator back and forth in the range $f_p'$—$f_p''$ during the period before the transmitter oscillator reaches its normal level of efficiency, whereby, at some time after it reaches this level, there will be produced an intermediate frequency signal such that the output from the discriminator in response thereto will cause the local oscillator to seek the proper output frequency to yield the desired intermediate frequency. The invention also contemplates means responsive to the output from the discriminator for inactivating the sweeping means when the automatic frequency control circuits have become effective.

The means for accomplishing these results in accordance with the invention will now be generally described with reference to Fig. 3 of the drawings. The resemblance between portions of the arrangement of Fig. 3 and that of Fig. 1 will be noted. The system according to Fig. 3 comprises a converter 9 supplied with input from the transmitter oscillator of the radar system and also supplied through connection 10 with local oscillator signal from local oscillator 11. The intermediate frequency produced by converter 9 is supplied through connection 12 to a discriminator 13. The output from local oscillator 11 is also supplied through connections 14 and 15, respectively, to cavity resonators 16 and 17, which are tuned, respectively, to the upper and lower limits of the range throughout which the local oscillator frequency must vary in accordance with the requirements as hereinbefore set forth in the discussion of Fig. 2. That is, cavity resonator 16 may be tuned to the upper limiting frequency $f_p''$ while cavity resonator 17 may be tuned to the lower limiting frequency $f_p'$. Thus, when the output frequency of local oscillator 11 approaches the frequency to which resonator 16 is tuned, that resonator will be excited; while, on the other hand, when the output frequency of the local oscillator approaches the frequency to which resonator 17 is tuned, that resonator will be excited. Associated with the resonators 16 and 17 are suitable detectors 16a and 17a for developing unidirectional potentials whose magnitudes are functions of the extent of excitation of the particular resonators with which they are respectively associated. These detectors, for example, may comprise crystal diodes appropriately coupled to the cavities and differently connected so as to develop potentials of opposite polarities in response to excitation of their respective cavities. The output leads from these detectors are connected to a signal adding device 18, from the output of which there will be derived a potential whose polarity will be positive or negative depending upon which of the resonators is excited. This potential is supplied through connection 19 to control the operation of a sweep multivibrator 20. The output from sweep multivibrator 20 is supplied through connection 21 to a switch 22, which is also supplied through connection 23 with the output from discriminator 13. Switch 22 is further controlled through connection 24 from discriminator 13 so that, in the absence of output from discriminator 13, switch 22 interconnects connection 21 with connection 25 so that the output from sweep multivibrator 20 is supplied to local oscillator 11 to control the frequency of the latter. Sweep multivibrator 20 may be of conventional form, having two different conditions of output in its operating cycle. The output corresponding to one of these conditions may be used to cause the frequency of local oscillator 11 to sweep in one direction; while the output corresponding to the other condition may cause the local oscillator frequency to sweep in the other direction. Moreover, the output from voltage adder 18, depending upon its polarity, may be used to determine which of these output conditions exists at any given time. Thus, assuming the output from multivibrator 20 to be such as to cause the local oscillator 11 to sweep from a lower to a higher frequency, when the frequency of the local oscillator reaches the upper limit of the desired range, high frequency resonator 16 will be excited in response to the output of local oscillator 11 at the upper frequency limit, this will produce a potential of predetermined polarity in the output of signal adder 18 and this potential, supplied through connection 19 to multivibrator 20, will cause it to assume its other output condition and to commence sweeping the local oscillator downward in frequency. When the output frequency of the local oscillator reaches the lower limit of the range, low frequency resonator 17 will be excited, a potential of opposite polarity will appear in the output of signal adder 18, and this will again cause the multivibrator to change from one to the other of its two output conditions. This action will continue until a suitable signal from the transmitter oscillator is supplied to the input of converter 9; whereupon discriminator 13 will be activated and will supply control signals through connections 23 and 24 to switch 22. The signal thus supplied through connection 24 will cause switch 22 to complete a connection through connections 23 and 25 from discriminator 13 to local oscillator 11 and to interrupt the connection from sweep multivibrator 20 to local oscillator 11. When this occurs, the frequency of the output from local oscillator 11 will no longer be swept back and forth in response to the output from sweep multivibrator 20 but will be controlled in the desired manner in response to the control signal developed by discriminator 13. Thus there is provided a system in which, during the "warm-up" period of the transmitter oscillator, the frequency of the receiver local oscillator is swept back and forth throughout a range which encompasses all of the potentially desirable values thereof required to yield the desired intermediate frequency, and in which, when the transmitter becomes operative and a suitable intermediate frequency signal becomes available to operate the discriminator, the sweeping action is discontinued and the output of the discriminator is threafter used to control the local oscillator.

Having described in general the principles underlying the invention and the mode of operation of a system in accordance therewith, there will now be described in detail a representative embodiment of a system according to the invention as applied to a typical radar system. In Fig. 4 radar transmitter 41 is actuatable in response to power supplied to it from power supply 38 upon the closing of switch 39, and is controlled by a pulser 40 to produce time-spaced pulses of super-high frequency energy. These pulses are supplied through a waveguide 42 to a suitable transmitting and receiving antenna 43. The latter transmitts this energy and also intercepts reflections thereof from target objects, which are transmitted through waveguide section 42, T-R device 45 and waveguide section 46 to a crystal mixer 47. The latter is also supplied through waveguide section 48 with local oscillations from thermally tunable, velocity-modulation type local oscillator tube 49. Crystal mixer 47 operates to convert the signals thus supplied to it to a suitable intermediate frequency signal which may then be supplied through transmission line 50 to the usual radar receiver (not shown). It is to be noted that, in accordance with prior practice, an anti-T-R device 51 is connected to waveguide section 42 for the purpose of preventing loss of received signals to the radar transmitter 41.

Signals from radar transmitter 41 are also supplied from waveguide 42 through a suitable attenuator 53, and waveguide 54, to auxiliary crystal mixer 55. The latter is also supplied through waveguide 56 with signal from local oscillator 49. Crystal mixer 55 functions to convert the radar transmitter signals supplied to it to a suitable intermediate frequency, which is the same as that produced by crystal mixer 47. Received signals from antenna 43 are, of course, attenuated to such an extent, by attenuator 53, that, in effect, none of them appear at mixer 55. This intermediate frequency signal is supplied through a conventional intermediate frequency amplifier 57, including a final stage comprising tube 58, to a discriminator circuit 62. The latter comprises diodes 59 and 60 and a plural secondary transformer 61, the primary winding of which is included in the plate circuit of I.-F. amplifier tube 58. This circuit is conventional in form, the secondaries 61a and 61b of transformer 61 being tuned respectively to frequencies slightly above and slightly below the desired I.-F. frequency. The operation of this form of circuit is well understood by those skilled in the art to which this invention relates, and accordingly need not here be discussed in detail. The discriminator output is developed across resistors 63 and 64, connecting the cathodes of diodes 59 and 60, and is supplied through an amplifier 65, adapted to produce an even number of phase inversions, to connection 66 between the cathode of tube 67 and the plate of tube 68. The plate of tube 67 and the cathode of tube 68 are connected together by means of connection 68a, and both are connected through resistor 70 to one plate of condenser 71, whose other plate is grounded. Tubes 67 and 68 and the associated connections, just described, comprise a gate and integrator circuit 69. In response to pulses supplied from pulser 40 through connection 72 and transformers 73 and 74 to the grids of tubes 67 and 68, the latter are biased to conduct during intervals coextensive with the transmission of pulses by radar transmitter 41. If, during these intervals, the potential applied to connection 66 is positive, current will flow through tube 68 and resistor 70 into condenser 71, thereby increasing its charge. On the other hand, if, during these intervals, the potential applied to connection 66 is negative, current will flow from the condenser through resistor 70 and tube 67 in a manner to reduce the charge on the condenser. The ungrounded plate of condenser 71 is connected to the grid of a cathode follower tube 75, and a connection 76, including an isolating resistor 76a, is provided between the cathode of tube 75 and connection 66. By reason of this connection, in the absence of discriminator output supplied to connection 66 from amplifier 65, connection 66 will be maintained at a potential such that current will flow in neither tube 67 nor tube 68, and hence condenser 71 will tend to maintain its charge. If, however, the potential applied to connection 66 during the intervals corresponding to transmitted pulses includes output, either positive or negative, from discriminator 62, current will flow in one or the other of tubes 67 and 68, thereby tending to modify the charge on condenser 71 in accordance with the discriminator output. Thus there is developed across condenser 71 a potential which is determined by the output from discriminator 62 during the intervals corresponding to the transmission of pulses by the radar. Between such intervals the potential across condenser 71 tends to remain substantially constant except as modified by any fortuitous leakage of the condenser.

The potential developed across condenser 71 is supplied through connection 77 to the control grid of a pentode 78, which, together with another pentode 79, forms a switch circuit 80. There is also provided a connection 81 from a load resistor 82, in the plate circuit of I.-F. amplifier tube 58, to the grid of a switch control tube 83. This connection includes resistor 89, whose function will be explained presently. Switch control tube 83 is provided with load resistors 84 and 85 connected respectively in its plate and cathode circuits. There is a connection 86, including resistor 86a, from the plate of tube 83 to the suppressor grid of switch tube 78. Also there is a connection 87, including resistor 87a, from the cathode of tube 83 to the suppressor grid of the other switch tube 78. Condenser 88, by-passing resistor 82 in the plate circuit of tube 58, is chosen so that the time constant of the R. C. circuit comprising resistor 82 and condenser 88 will be long compared to the durations of intervals between transmitted radar pulses. Accordingly, when the radar transmitter is operating and input is being supplied to discriminator 62, a more-or-less constant negative potential will be developed across condenser 88. Any tendency of this potential to vary at the radar pulse repetition rate may be further reduced by means of a filter circuit comprising resistor 89 and condenser 90, the values of which are likewise selected to provide a time constant long compared to the intervals between transmitted radar pulses. It is also to be noted that the value of resistor 89 is to be selected with a view to providing appropriate plate potential for tube 58 and suitable grid bias for tube 83. Thus, when discriminator 62 is functioning, a negative bias will be applied through connection 81 to the grid of switch control tube 83 and will tend to reduce the current flow through the latter, thereby reducing its cathode potential and increasing its plate potential. By reason of connections 86 and 87 from tube 83 to the suppressor grids of tubes 78 and 79, signals applied to the control grid of switch tube 78 will be caused to appear across resistor 121, but signals applied to the control grid of tube 79 will not.

Output from thermally tunable local oscillator 49 is also supplied through waveguide sections 95 and 96, having suitable wideband terminations 95a and 96a, to cavity resonators 97 and 98, which may be of conventional cylindrical configuration and which are tuned respectively to the lower and upper frequency limits of the range throughout which the frequency of the local oscillator 49 must vary in accordance with the principles hereinbefore set forth. Coupling from cavity 49a of local oscillator tube 49 to waveguide sections 95 and 96 is through a short transmission line section 101 and capacitive probe 102. Coupling from waveguide sections 95 and 96 to cavity resonators 97 and 98 is through coupling irises 103 and 104, in accordance with conventional practice. Also coupled respectively to resonators 97 and 98 are waveguide sections 105 and 106, such coupling being effected through irises 107 and 108. Each of the waveguide sections 105 and 106 is preferably terminated at one end by a suitable wideband termination 109 including a resistive strip 109a, and, at its opposing end, by an adjustable plunger 110. Proximate to plunger 110 in waveguide sections 105 and 106 are disposed crystal diodes 99 and 100, which are adapted to respond respectively to the excitation of resonators 97 and 98, energy from one of said resonators, when it is excited, being transmitted to the corresponding diode through one of waveguide sections 105, 106. Plungers 110 may, of course, be adjusted to produce maximum output from each diode. Diodes 99 and 100 are differently disposed within their respective waveguide sections 105 and 106 so that their respective outputs will be of opposite polarities. The actual arrangement of the diodes within waveguide sections 105 and 106 in typical apparatus is indicated in Figures 4A and 4B respectively. These figures are self explanatory.

The output terminals of diodes 99 and 100 are connected through a common load resistor 111 to ground. There is a connection from the ungrounded terminal of load resistor 111 to the grid of a multivibrator control tube 112, having load resistors 113 and 114 connected respectively in its plate and cathode circuits. There is a connection from the plate of tube 112 to the grid of tube 115, which, together with tube 116, comprises a conventional multivibrator circuit 117. Also there is a connection from cathode load resistor 114 through a cathode-coupled tube 118 to the grid of the other multivibrator tube 116. The output of multivibrator 117, derived across plate load resistor 119, is supplied through connection 120, including resistor 120a, to the control grid of switch tube 79. The control grid of tube 79 is connected through resistor 120b to ground, and resistors 120a and 120b cooperate to provide suitable grid bias for tube 79. The output of switch circuit 80, developed across a common resistor 121 in the plate circuit of switch tubes 78 and 79, is supplied through transmission line 122 to the thermal control grid of thermally tunable local oscillator tube 49. A suitable bias is applied to this grid through the cooperation of resistors 123, 124 and 121. As is well known, the signals thus supplied to the thermal control grid of the thermally tunable oscillator tube are effective to produce changes in the tuning of cavity resonator 49a through the agency of a thermal strut 49b.

Referring still to Fig. 4, the operation of the system there illustrated is as follows. During the time immediately after radar transmitter 41 is activated by closing switch 39 and until it has reached a substantial output level, no substantial signal will be supplied through waveguide section 42, attenuator 53, and waveguide section 54 to the auxiliary mixer crystal 55. Hence, no intermediate frequency output will be available for supply through I.-F. amplifier 57 to discriminator 62. Accordingly the bias applied through connection 81 from load resistor 82 in the plate circuit of I.-F. amplifier tube 58 to the control grid of switch control tube 83 will be relatively positive. Therefore, by reason of the connections 86 and 87 from the plate and cathode of tube 83 respectively to the suppresser grids of switch tubes 78 and 79, if the values of resistors 86a and 87a are appropriately selected, signals applied to the control grid of switch tube 79 will appear across resistor 121 but signals applied to the control grid of switch tube 78 will not. Hence, signals from the output of sweep multivibrator 117 will be supplied through connection 120 to the control grid of switch tube 79 and thence from the plate of tube 79 through transmission line 122 to the thermal control grid of local oscillator tube 49. These signals will, depending upon the condition of sweep multivibrator 117, cause the frequency of the output from local oscillator tube 49 either to increase or decrease. In one of these conditions, multivibrator tube 116 will conduct; while, in the other condition, it will be cut off. The plate potential of tube 116, when it is conductive, will be more negative than when it is cut off. Hence, when tube 116 is conductive, the potential applied to the thermal control grid of local oscillator tube 49 will be positive and such as to effect an increase in the frequency of the output therefrom. Such increase will continue until the frequency of the output reaches the frequency to which high frequency cavity resonator 98 is tuned. When this occurs, resonator 98 will be shock-excited in response to the output, and crystal 100 will respond to the oscillations in the resonator to develop a negative potential across resistor 111. This potential, acting through tubes 112 and 118 on tubes 115 and 116 of sweep multivibrator 117, will cause tube 115 to conduct and tube 116 to cut off. The output from sweep multivibrator 117, derived from the plate of tube 116, will then be relatively positive and, when applied through connection 120, tube 79 and transmission line 122, will cause the thermal control grid of local oscillator tube 49 to become more negative, thereby commencing a decrease in the frequency of the output of local oscillator tube 49. When the frequency of such output has reached the resonant frequency of low frequency cavity resonator 97, coupled to the output of local oscillator tube 49, resonator 97 will be shock-excited in response thereto and crystal diode 99 will respond to the oscillations in resonator 97 and will produce a positive potential across resistor 111. This potential, operating through control tubes 112 and 118 upon multivibrator tubes 115 and 116, will cause tube 115 to cut off and tube 116 to conduct. Then the output derived from the plate of multivibrator tube 116 will be relatively negative and a positive potential will be applied through transmission line 122 to the thermal control grid of local oscillator tube 49 so as to initiate an increase in the frequency of the output therefrom.

As soon as radar transmitter 41 reaches a substantial level of output, such output will be supplied through waveguide section 42, attenuator 53 and waveguide section 54 to the auxiliary mixed crystal 55. Through the cooperation of crystal 55 this signal will be mixed with the output from local oscillator 49 supplied through waveguide section 56 to produce an intermediate frequency signal more-or-less approximating the desired intermediate frequency. This signal, supplied through I.-F. amplifier 57 to the control grid of I.-F. amplifier tube 58 will cause an increase in the plate current thereof and a corresponding increase in the negative bias applied through connection 81 from load resistor 82 to the control grid of switch control tube 83. The increase in the plate current of tube 58 and in the bias applied to tube 83 will be greater the more nearly the intermediate frequency approaches the desired value. As hereinbefore mentioned, I.-F. signal is applied to the grid of discriminator input tube 58 only during intervals corresponding to the transmission of radar pulses. Accordingly, in order that the bias applied to the grid of switch control tube 83 may be maintained during the intervals between the transmission of such pulses, there must be some provision for integrating the potential developed across load resistor 82. As already stated, such integration is provided for by appropriate selection of the time constants of R. C. circuits 82, 88 and 89, 90. The relatively large negative bias applied to the control grid of switch control tube 83, when radar transmitter 41 is operating and the output from local oscillator 49 is of nearly the proper frequency to produce the desired intermediate frequency signal, will cause the potential applied through connection 86 to the suppressor grid of switch tube 78 to be relatively positive, and that applied through connection 87 to the suppressor grid of switch tube 79 to be relatively negative. Hence signals applied to the control grid of switch tube 78 will be caused to appear across load resistor 121, and those applied to the control grid of switch tube 79 will not. As a result of this, local oscillator tube 49 will no longer be controlled in response to the output from sweep multivibrator 117, but instead will be controlled in response to an automatic frequency control voltage developed across condenser 71 and applied through connection 77 to the control grid of tube 78. If the potential across condenser 71 becomes more positive, the potential applied from the plate of switch tube 78 to the thermal control grid of the local oscillator tube 49 will become more negative and will effect a reduction in the frequency of the output from local oscillator 49. On the other hand, if the potential across condenser 71 becomes more negative, the potential applied to the thermal control grid of local oscillator tube 49 will become more positive and the frequency of the output from the local oscillator tube will tend to increase.

With respect to the operation of discriminator 62 and gate and integrator circuit 69, if the intermediate frequency signal applied to the grid of amplifier tube 58 is higher than desired, a negative potential will be developed across discriminator load resistor 64, which will be applied through amplifier 65 to connection 66 between the cathode of gate tube 67 and the plate of gate tube 68. This will cause tube 67 to conduct and thereby decrease the potential across condenser 71. For the reasons hereinbefore mentioned, this will effect an increase in the frequency of the output from local oscillator 49, which will tend to restore the intermediate frequency to the desired value. Similarly, if the intermediate frequency signal is too low, a positive potential will appear across discriminator load resistor 63 which, when applied through amplifier 65 to connection 66, will cause tube 68 to conduct and increase the potential across condenser 71. This, in turn, will reduce the potential applied to the grid of local oscillator tube 49 and will cause the frequency of the output therefrom to decrease in a manner to restore the intermediate frequency to the desired value. As hereinbefore indicated, gate and integrator circuit 69 is employed to maintain the afc voltage developed across condenser 71 during the intervals between transmitted radar pulses when no discriminator output is available.

It will be apparent that the frequencies to which cavity resonators 97 and 98 are tuned may be appropriately selected so as to cause the frequency of local oscillator 49, during the period of warm-up of radar transmitter 41, to vary throughout a suitable range, as determined by the probable range of variation of the transmitter output frequency, so that, when radar transmitter 41 reaches its normal output level, some frequency within this range will correspond to the appropriate local oscillator frequency for mixing with the radar transmitter frequency to yield the desired intermediate frequency. On the other hand, the resonant frequencies of cavity resonators 97 and 98 may be selected so that this range does not include frequencies which, when mixed with the output from the radar transmitter, would yield an intermediate frequency such as to cause instability of operation of discriminator 62 for the reasons hereinbefore outlined.

Finally it will be noted that a system according to the invention, as exemplified in the embodiment of Fig. 4, will operate not only to cause the frequency of the local oscillator to sweep throughout a predetermined desired range during the period of "warm-up" of the radar transmitter and until the usual automatic frequency control circuits become operative, but it will also be effective after the transmitter is operating normally and when, for any reason, the I.-F. signal departs in frequency by a substantial amount from the desired value, so that the usual automatic frequency control circuits cease to function. When this occurs the bias applied through connection 81 to switch control tube 83 will become less negative, and switch 80 will be controlled thereby so as to permit sweep multivibrator 117 to control the frequency of local oscillator 49 until the intermediate frequency has been restored to the desired range, whereupon the discriminator 62 will again take over control of the local oscillator in the manner hereinbefore described.

I claim:

1. In an automatic frequency control system for a superheterodyne receiver, a local oscillator whose frequency is controllable in response to a control voltage, a converter supplied with signals from said local oscillator and responsive to modulated carrier wave signals to produce correspondingly modulated intermediate frequency signals, a frequency discriminator supplied with said intermediate frequency signals and operative to produce a first control signal in response to deviations of said intermediate frequency from a predetermined reference value when said intermediate frequency lies within a predetermined range, a pair of cavity resonators separately supplied with signals from said local oscillator, the frequency bandwidths of said resonators being sufficiently small with respect to the separation between their respective resonant frequencies so that the response of each of said resonators is substantial only at frequencies for which the response of the other of said resonators is negligible, a generator of an alternating control signal for cyclically varying the frequency of said local oscillator thereby to cause said intermediate frequency to sweep through said operating frequency range of said discriminator, means for deriving detected signals from said cavity resonators and for applying said detected signals to said control signal generator to effect reversals in the sense of variation of said alternating control signal, switch means normally supplying said alternating control signal to said local oscillator to vary the frequency thereof, and means responsive to said control signal generated by said discriminator for actuating said switch to supply said last-named control signal to said local oscillator in place of said alternating control signal from said control signal generator.

2. In a radar system employing a superheterodyne receiver, a source of transmitted carrier-wave signals whose frequency is susceptible to variation between two predetermined limits, a local oscillator for generating a signal whose frequency is controllable in response to a control voltage, a converter supplied with said carrier-wave signals and with signals from said local oscillator for producing intermediate frequency signals, a frequency discriminator supplied with said intermediate frequency signals and operative to produce a first control signal in response to deviations of said intermediate frequency from a predetermined reference value when said intermediate frequency lies within a predetermined range, a pair of cavity resonators separately supplied with signals from said local oscillator, the resonant frequency of one of said resonators lying without said limits of frequency variation of said carrier wave signals and differing from the nearest of said limits by an amount at least as great as said reference value of intermediate frequency, the resonant frequency of the other of said resonators differing from said last-named frequency limit by an amount less than said reference value of intermediate frequency, the frequency bandwidths of said resonators being sufficiently small with respect to the separation between their respective resonant frequencies so that the response of each of said resonators is substantial only at frequencies for which the response of the other of said resonators is negligible, a generator of an alternating control signal for cyclically varying the frequency of said local oscillator thereby to cause said intermediate frequency to sweep through said operating frequency range of said discriminator, means for deriving detected signals from said cavity resonators and for applying said detected signals to said control signal generator to effect reversals in the sense of variation of said alternating control signal, electrically actuatable switch means normally supplying said alternating control signal to said local oscillator to vary the frequency thereof, and means responsive to said control signal generated by said discriminator for actuating said switch means to supply said last-named control signal to said local oscillator in place of said alternating control signal from said control signal generator.

ALLEN C. MUNSTER.

REFERENCES CITED

The following references are of record in the file of this patent:

UNITED STATES PATENTS

| Number | Name | Date |
|---|---|---|
| 2,243,202 | Fritz | May 27, 1941 |
| 2,410,817 | Ginzton et al. | Nov. 12, 1946 |
| 2,420,264 | Rost et al. | May 6, 1947 |
| 2,425,657 | Tunick | Aug. 12, 1947 |
| 2,425,922 | Crosby | Aug. 19, 1947 |
| 2,434,294 | Ginzton | Jan. 13, 1948 |